(12) United States Patent
Haari et al.

(10) Patent No.: US 9,701,915 B2
(45) Date of Patent: Jul. 11, 2017

(54) GASIFICATION FURNACE, GASIFICATION POWER PLANT, AND METHOD OF PREVENTING BLOCKAGE OF SLAG HOLE IN GASIFICATION FURNANCE

(71) Applicant: MITSUBISHI HITACHI POWER SYSTEMS, LTD., Kanagawa (JP)

(72) Inventors: Kenta Haari, Tokyo (JP); Osamu Shinada, Tokyo (JP); Yasunari Shibata, Tokyo (JP); Yuichiro Kitagawa, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 426 days.

(21) Appl. No.: 14/366,983

(22) PCT Filed: Jan. 22, 2013

(86) PCT No.: PCT/JP2013/051137
§ 371 (c)(1),
(2) Date: Jun. 19, 2014

(87) PCT Pub. No.: WO2013/111721
PCT Pub. Date: Aug. 1, 2013

(65) Prior Publication Data
US 2014/0366504 A1  Dec. 18, 2014

(30) Foreign Application Priority Data

Jan. 25, 2012 (JP) .................................. 2012-013167

(51) Int. Cl.
*F02C 3/22* (2006.01)
*C10J 3/74* (2006.01)
(Continued)

(52) U.S. Cl.
CPC ................. *C10J 3/74* (2013.01); *C10J 3/485* (2013.01); *C10J 3/526* (2013.01); *C10J 3/86* (2013.01);
(Continued)

(58) Field of Classification Search
CPC ..... C10J 3/74; C10J 3/485; C10J 3/526; C10J 3/86; F02C 3/22; F02C 3/205; F02C 3/26; F02C 3/28; Y02E 20/18
See application file for complete search history.

(56) References Cited

U.S. PATENT DOCUMENTS

2010/0011908 A1* 1/2010 Goodman ........... C21B 13/0013
75/382
2010/0325957 A1* 12/2010 Klockow ................... C10J 3/84
48/87
(Continued)

FOREIGN PATENT DOCUMENTS

| CN | 1050039 | 3/1991 |
| CN | 1221446 | 6/1999 |

(Continued)

OTHER PUBLICATIONS

Notification of Grant of Invention Patent issued Feb. 16, 2016 in corresponding Chinese patent application No. 201380004766.0 (with English translation).
(Continued)

*Primary Examiner* — Derek Battisti
(74) *Attorney, Agent, or Firm* — Wenderoth, Lind & Ponack, L.L.P.

(57) ABSTRACT

An object is to prevent blockage of a slag hole with char and slag, enabling stable operation of a gasification furnace. In a configuration in which a heat exchanger (20) is provided above a coal gasification portion (10), the diameters (D1, D3) of the slag hole (16) and the throat portion (17) are set
(Continued)

to three times or more the pitch (ST) of rows of heat exchange tubes (21). By doing so, blockage of the slag hole (16) or the throat portion (17) with char and a sintered material (50) falling from the heat exchanger (20) is prevented, enabling stable operation of a coal gasification furnace (101).

6 Claims, 3 Drawing Sheets

(51) Int. Cl.
*C10J 3/48* (2006.01)
*C10J 3/52* (2006.01)
*C10J 3/86* (2006.01)

(52) U.S. Cl.
CPC ............ *F02C 3/22* (2013.01); *C10J 2300/093* (2013.01); *C10J 2300/1606* (2013.01); *C10J 2300/1653* (2013.01); *C10J 2300/1892* (2013.01); *F05D 2220/722* (2013.01); *Y02E 20/16* (2013.01); *Y02E 20/18* (2013.01)

(56) References Cited

U.S. PATENT DOCUMENTS

2011/0286891 A1* 11/2011 Jang ...................... F22B 1/1838
422/162

2012/0070347 A1* 3/2012 Bacon ....................... C10J 3/00
422/186.04
2013/0340689 A1* 12/2013 Sato ......................... F23G 5/46
122/5

FOREIGN PATENT DOCUMENTS

| DE | WO2012034654 | * | 3/2012 | ................ C10J 3/84 |
|----|---|---|---|---|
| EP | 0 568 011 | | 2/1996 | |
| JP | 36-13769 | | 5/1961 | |
| JP | 61-233083 | | 10/1986 | |
| JP | 64-56787 | | 3/1989 | |
| JP | 5-311180 | | 11/1993 | |
| JP | 7-5898 | | 1/1995 | |
| JP | 7-97579 | | 4/1995 | |
| JP | 8-302364 | | 11/1996 | |
| JP | 10-251671 | | 9/1998 | |
| JP | 10-330768 | | 12/1998 | |

OTHER PUBLICATIONS

Decision to Grant a Patent issued Sep. 1, 2015 in corresponding Japanese patent application No. 2012-013167.
Office Action issued Jun. 30, 2015 in corresponding Chinese patent application No. 201380004766.0.
International Search Report issued Feb. 26, 2013 in International Application No. PCT/JP2013/051137.
Written Opinion of the International Searching Authority issued Feb. 26, 2013 in International Application No. PCT/JP2013/051137.

* cited by examiner

GASIFICATION FURNACE, GASIFICATION POWER PLANT, AND METHOD OF PREVENTING BLOCKAGE OF SLAG HOLE IN GASIFICATION FURNACE

TECHNICAL FIELD

The present invention relates to a gasification furnace, a gasification power plant, and a method of preventing blockage of a slag hole in a gasification furnace, applied to, for example, integrated gasification combined cycle (IGCC) facilities.

BACKGROUND ART

IGCC can efficiently generate power by combining a steam turbine and a gas turbine, by gasifying solid coal in a gasification furnace.

Furthermore, whereas conventional coal-fired plants produce a large amount of coal ash, IGCC discharges glass-like slag (ash) after gasifying coal in the gasification furnace. The volume of the slag discharged from the gasification furnace is substantially half that of the coal ash discharged from conventional coal-fired boilers.

A gasification furnace includes a combustor that combusts fuel to produce high-temperature gas, and a reductor that is located above the combustor and communicates with the combustor. In the reductor, fuel is brought into contact with the high-temperature gas to cause gasification reaction and is gasified.

PTL 1 discloses a configuration of such a gasification furnace, in which a panel-type water wall (hereinbelow, also referred to as a "heat exchanger"), serving as a cooling means, is provided above the reductor in order to cool the high temperature gas that has passed through the gasification reaction in the reductor.

CITATION LIST

Patent Literature

{PTL 1} Japanese Examined Patent Application, Publication No. Hei 7-5898

SUMMARY OF INVENTION

Technical Problem

When a heat exchanger serving as a cooling means is provided above the reductor, a sintered material that is produced by sintering in gasified gas accumulates on the heat exchanger. If this sintered material accumulated on the heat exchanger falls onto a diffuser portion or the combustor located therebelow, a slag hole provided on the lower side of the gasification furnace may be blocked. Blockage of the slag hole inevitably poses a problem for operation of the gasification furnace.

The present invention has been made in view of the above-described circumstances, and it is an object of the present invention to provide a gasification furnace and a gasification power plant in which blockage of a slag hole by a sintered material is prevented, to enable stable operation of the gasification furnace.

Solution to Problem

To overcome the above-described problems, the present invention employs the following solutions.

That is, a gasification furnace according to a first aspect of the present invention includes a gasification portion that combusts fuel to produce high-temperature gas; a heat exchanger that is located above the gasification portion, performs heat exchange with the gasified fuel, and has a gas flow path; and a slag hole that is formed at the bottom of the gasification portion, is used to discharge a sintered material produced by gasifying the fuel, and has an opening diameter that is three times or more the width, in a direction perpendicular to the gas flow direction, of the gas flow path in the heat exchanger.

In such a gasification furnace, the gasification portion may include a combustor for combusting fuel, and a reductor for gasifying the fuel, which is located above the combustor, communicates with the combustor, and has the gas flow path.

Herein, when the upper heat exchanger has a configuration in which heat exchange tubes, through which water etc. flows, are arranged at intervals in a direction perpendicular to the gas flow direction, the width of the gas flow path is equal to the pitch of the rows of the heat exchange tubes.

In such a gasification furnace, a throat portion formed by reducing the diameter of the flow path of the gasification portion may be provided above the slag hole, the throat portion being formed such that the opening diameter thereof is three times or more the width, in a direction perpendicular to the gas flow direction, of the gas flow path in the heat exchanger.

With the gasification furnace according to the first aspect of the present invention, by setting the opening diameters of the slag hole and the throat portion, which are located below the heat exchanger, three times or more the width of the gas flow path of the upper heat exchanger, even if a sintered material produced in the upper heat exchanger falls down, blockage of the slag hole can be prevented.

Furthermore, a gasification power plant according to a second aspect of the present invention includes the gasification furnace as described above; a gas purification facility that removes an impurity from the produced gas produced in the gasification furnace; and a gas turbine that is driven by the gas purified by the gas purification facility.

A method of preventing blockage of a slag hole in a gasification furnace according to a third aspect of the present invention includes providing a gasification portion that combusts fuel to produce high-temperature gas; and providing a heat exchanger that is located above the gasification portion, performs heat exchange with the gasified fuel, and has a gas flow path. The opening diameter of a slag hole, which is formed at the bottom of the gasification portion and is used to discharge a sintered material produced by gasifying the fuel, is set to three times or more the width, in a direction perpendicular to the gas flow direction, of the gas flow path in the upper heat exchanger.

With the method of preventing blockage of a slag hole in a gasification furnace according to the third aspect of the present invention, by setting the opening diameter of the slag hole, which is located below the heat exchanger, three times or more the width of the gas flow path of the upper heat exchanger, even if a sintered material produced in the upper heat exchanger falls down, blockage of the slag hole can be prevented.

Advantageous Effects of Invention

According to the present invention, by setting the opening diameter of the slag hole, which is located below the heat exchanger, three times or more the width of the gas flow path of the upper heat exchanger, even if a sintered material produced in the upper heat exchanger falls down, blockage of the slag hole can be prevented. Hence, it is possible to perform stable operation of the gasification furnace.

DESCRIPTION OF EMBODIMENTS

Figure 1:
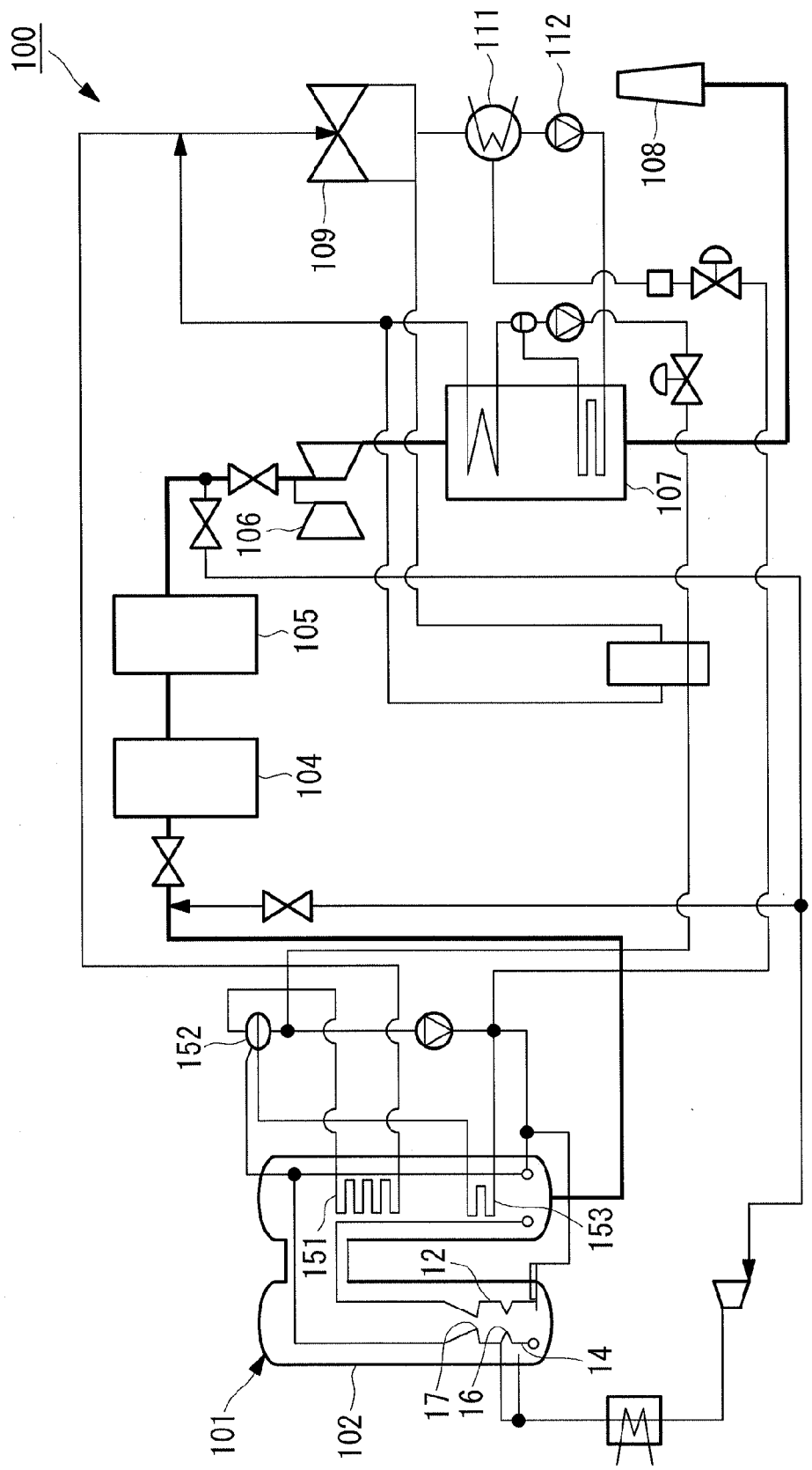
FIG. 1 is a schematic diagram showing the configuration of an IGCC facility according to this embodiment.

Embodiments of the present invention will be described below with reference to the drawings.

A first embodiment of the present invention will be described using FIG. 1.

A gasification furnace of the present invention is used in an integrated coal gasification combined cycle (IGCC) facility (gasification power plant) as, for example, an apparatus for generating combustible gas by charging crushed coal (pulverized coal) into a furnace. In the IGCC facility, combustible gas generated in the gasification furnace is supplied to a gas turbine combustor to be used as fuel for the gas turbine. On the other hand, ash in the coal, in the form of water-granulated slag, needs to be discharged outside the furnace from the bottom of the gasification furnace.

A coal gasification furnace 101 produces produced gas by gasifying coal, which is fuel supplied from a coal supply path (not shown). The coal gasification furnace 101 also produces steam by circulating water (fluid) through a water pipe 154 (see FIG. 2) or the like provided on a wall.

The coal gasification furnace 101 includes a coal gasification portion 10 that is provided on the upstream side in the coal gasification furnace 101 such that the generated produced gas is guided from the lower side to the upper side; and an evaporator 151, a superheater (not shown), and an economizer 153, which are connected on the downstream side in the coal gasification furnace 101, in the order in which the produced gas is guided from the upstream side to the downstream side. The produced gas exchanges heat in each of the evaporator 151, the superheater, and the economizer 153 when passing through the evaporator 151, the superheater, and the economizer 153. The coal gasification portion 10 is accommodated in a coal gasification furnace pressure vessel 102, together with the evaporator 151, the superheater, and the economizer 153. Thus, the produced gas is prevented from flowing out of the coal gasification furnace pressure vessel 102.

Figure 2:
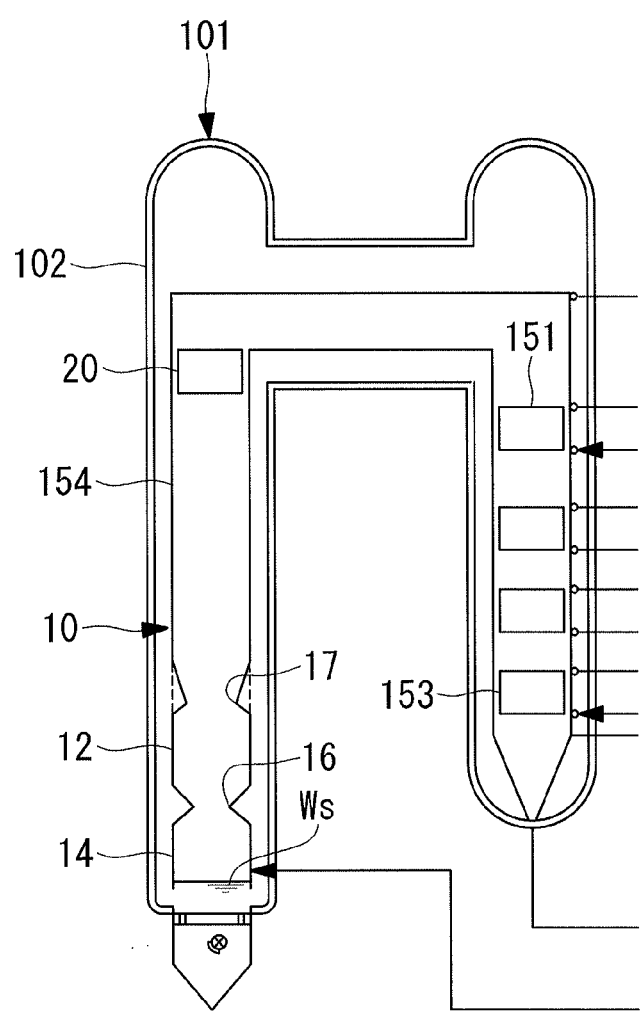
FIG. 2 is a diagram showing a configuration example of a coal gasification furnace.

As shown in FIG. 2, the coal gasification portion 10 of the coal gasification furnace 101 has a bottomed cylindrical combustor 12, a reductor (not shown) provided above the combustor 12, and a startup fuel combustion chamber 14 that has a bottomed cylindrical shape and is provided below the combustor 12. The startup fuel combustion chamber 14 stores slag cooling water Ws therein (on the bottom).

The combustor 12 combusts part of coal and char. The combustor 12 has a slag hole 16, which is open at the center of the bottom of the bottomed cylinder. This slag hole 16 serves as a passage opening that allows the slag, discharged by combusting part of the pulverized coal in the combustor 12, to flow down to the slag cooling water Ws in the startup fuel combustion chamber 14.

The slag flowing down to the slag cooling water Ws is cooled and hardened and then discharged outside the gasification furnace 101 from an outlet provided in the bottom (not shown) of the startup fuel combustion chamber 14.

The reductor gasifies the coal using the high-temperature gas guided from the combustor. As a result, combustible produced gases, such as carbon monoxide and hydrogen, are generated from the coal. The coal gasification reaction is an endoergic reaction in which carbon in the coal and char reacts with carbon dioxide and water in the high temperature gas, generating carbon monoxide and hydrogen.

As shown in FIG. 1, water is supplied to the evaporator 151 from the outside of the coal gasification furnace 101. The water supplied to the evaporator 151 is vaporized by heat exchange with the high-temperature produced gas guided from the reductor and is guided to a coal gasification furnace steam drum 152, which serves as a steam separator and has a gas region and a water region (fluid region).

Note that the water region is an area in the coal gasification furnace steam drum 152 where water exists, and the gas region is an area where water does not exist.

Steam produced by separating water in the coal gasification furnace steam drum 152 is guided to the superheater. The steam guided to the superheater becomes superheated vapor through heat exchange with the high-temperature produced gas and is then guided to a steam turbine 109.

Water is supplied to the economizer 153. The water supplied to the economizer 153 increases in temperature through heat exchange with the produced gas that has been reduced in temperature by giving heat to the evaporator 151 and the superheater. The heated water is guided to the coal gasification furnace steam drum 152.

The produced gas that has been reduced in temperature by passing through the evaporator 151, the superheater, and the economizer 153 contains impurities, such as dust, and a sulfur compound, such as hydrogen sulfide or carbonyl sulfide. The produced gas containing dust and sulfur compound is guided from the coal gasification furnace 101 to the gas purification facility. Note that the gas purification facility includes a dust removing apparatus 104 and a desulfurization apparatus 105.

The dust removing apparatus 104 removes dust, which is an impurity in the produced gas. The desulfurization apparatus 105 removes the sulfur compound, which is an impurity in the produced gas. The produced gas undergoes the dust removal and desulfurization processes in the dust removing apparatus 104 and the desulfurization apparatus 105 and is then guided to a gas turbine 106, in the form of clean purified gas that has been purified.

The purified gas guided to the gas turbine 106 is first directed to the combustor (not shown) provided in the gas turbine 106. The gas turbine 106 includes a combustor, a turbine (not shown) driven by exhaust gas combusted by the combustor, and a compressor (not shown) that charges high-pressure air into the combustor.

In the combustor, the purified gas and the air guided thereto are combusted, and exhaust gas (exhaust) is discharged. The exhaust gas discharged from the combustor is guided to the gas turbine 106, causing the gas turbine 106 to rotate. Due to the exhaust gas rotating the gas turbine 106, a rotary shaft (not shown) connected to the gas turbine 106 is rotated. The compressor is connected to the rotary shaft, and the compressor, due to the rotary shaft being rotated, is driven to compress air. The air compressed by the compressor is guided to the combustor and the coal gasification furnace 101. Furthermore, because the generator is connected to the rotary shaft, by rotating the rotary shaft, the generator is driven, thus generating power.

The exhaust gas that has rotated the gas turbine 106 is guided to an exhaust heat recovery boiler (fluid heating heat exchanger) 107. The exhaust heat recovery boiler 107 produces superheated vapor (fluid) using the heat of the exhaust gas guided from the gas turbine 106. The exhaust gas after heat recovery in the exhaust heat recovery boiler 107 is discharged outside an IGCC plant 100 through a smokestack 108.

The superheated vapor produced in the exhaust heat recovery boiler 107 is guided to the steam turbine 109. Furthermore, the superheated vapor is guided to the steam turbine 109 from the above-described coal gasification furnace steam drum 152 and the superheater. The steam turbine 109 is connected to the same rotary shaft as the gas turbine 106, forming a so-called single-shaft combined system. Note that the system does not necessarily have to be a single-shaft combined system, but may be a multi-shaft combined system.

Due to the steam being guided to the steam turbine 109, the driving force of the rotary shaft, driven by the gas turbine 106, increases even more. Therefore, the amount of power generated by the generator connected to the rotary shaft increases.

The steam used to rotate the steam turbine 109 is guided to a condenser 111. The steam guided to the condenser 111 is cooled by the seawater and returns to water (condensed water). The condensed water is supplied to the exhaust heat recovery boiler 107 by a low-pressure water supply pump 112 and is heated by the exhaust gas guided to the exhaust heat recovery boiler 107, thus becoming high-temperature water. The high-temperature water is guided again into the exhaust heat recovery boiler 107, becoming superheated vapor.

A heat exchanger (upper heat exchanger) 20 is provided above the coal gasification portion 10 of the above-described coal gasification furnace 101.

Figure 3A:
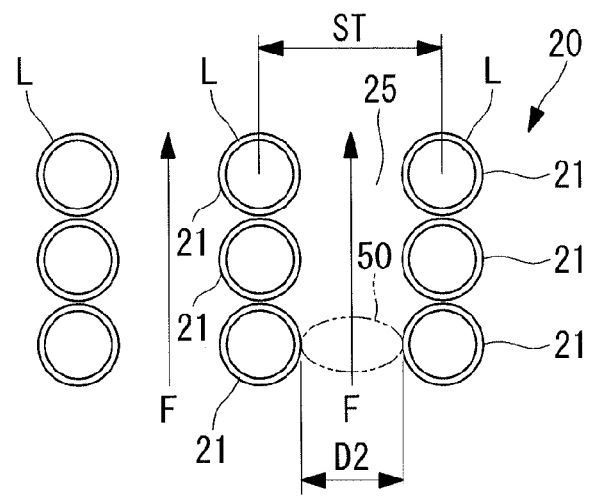
FIG. 3A is a cross-sectional view showing a configuration example of a heat exchanger provided above a coal gasification portion.

As shown in FIG. 3A, this heat exchanger 20 has, above the coal gasification portion 10, heat exchange tubes 21 that are arranged at a certain pitch ST in a direction perpendicular to gas flow F directed from the lower side to the upper side. These heat exchange tubes 21 are arranged in multiple stages in the gas flow F direction. That is, the heat exchange tubes 21 are arranged in rows in the gas flow F direction, at a certain pitch ST in the direction perpendicular to the gas flow F direction.

By allowing water or the like, supplied from the outside, to flow through these heat exchange tubes 21, the water and the gas passing through gas flow paths 25 between adjacent rows L and L of the heat exchange tubes 21 exchange heat, sufficiently cooling the gas.

Figure 3B:
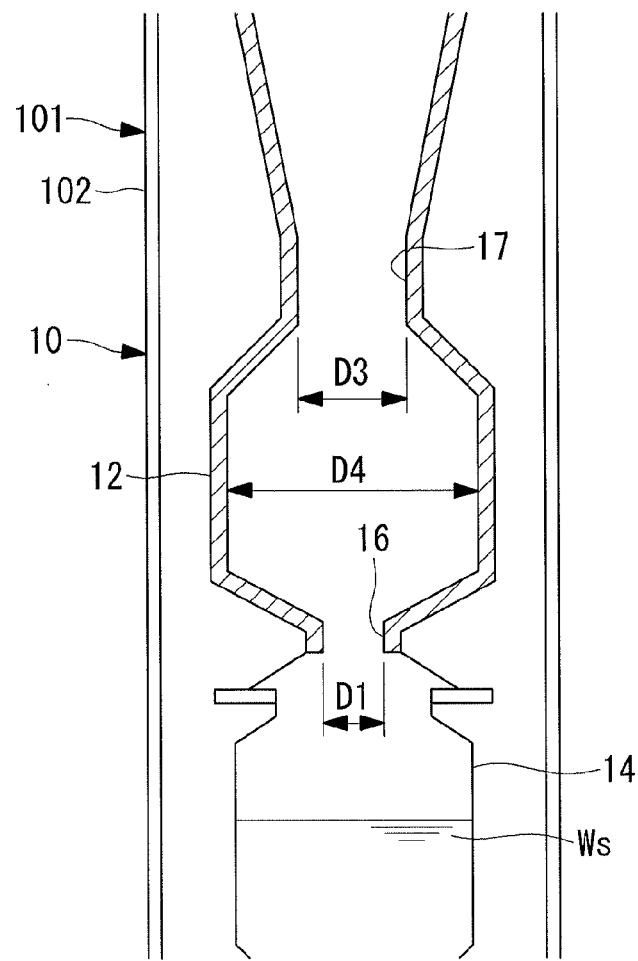
FIG. 3B is a cross-sectional view showing the relevant part of the coal gasification furnace.

Now, as shown in FIG. 3B, in the heat exchanger 20, the pitch ST and the slag hole 16 are formed such that the diameter (opening diameter) D1 of the slag hole 16 is three times or more the width of the gas flow paths 25, i.e., the pitch ST of the rows of the heat exchange tubes 21.

Sintered materials accumulate in the heat exchanger 20. The largest diameter D2 of sintered materials 50 is equal to the pitch ST of the rows of the heat exchange tubes 21.

If the diameter D1 of the slag hole 16 is about twice the pitch ST of the rows of the heat exchange tubes 21, when two pieces of char or sintered materials 50 are side-by-side in the slag hole 16, the slag hole 16 may be blocked.

In contrast, by making the diameter D1 of the slag hole 16 three times or more the pitch ST of the rows of the heat exchange tubes 21, blockage of the slag hole 16 with the sintered materials 50 does not occur.

On the other hand, the diameter D1 of the slag hole 16 is desirably one-fourth of the diameter D4 of the coal gasification furnace 101. If the diameter D1 of the slag hole 16 is about one-third of the diameter of the coal gasification furnace 101, the radiant heat of the combustor 12 escapes to the startup fuel combustion chamber 14.

Furthermore, a throat portion 17 formed by reducing the diameter of the coal gasification furnace 101 is sometimes formed above the slag hole 16. The diameter D3 of the throat portion 17 is desirably three times or more the pitch ST of the rows of the heat exchange tubes 21, like that of the slag hole 16. Note that the above-described coal gasification portion 10 may have a configuration with no throat portion 17, as shown by dashed lines in FIG. 2.

As has been described, the coal gasification furnace 101 and the IGCC facility according to this embodiment provide the following advantages.

Specifically, in the configuration in which the heat exchanger 20 is provided above the coal gasification portion 10, the diameters D1 and D3 of the slag hole 16 and the throat portion 17 are set to three times or more the pitch ST of the rows of the heat exchange tubes 21. By doing so, blockage of the slag hole 16 or the throat portion 17 with the sintered materials 50 falling from the heat exchanger 20 is prevented, enabling stable operation of the coal gasification furnace 101.

Note that the present invention is not limited to the above-described embodiment, and the configuration of the respective parts of the coal gasification furnace 101 may be appropriately modified.

For example, although the diameter D1 of the slag hole 16 is set to three times or more the pitch ST of the rows of the heat exchange tubes 21, even in a configuration in which the heat exchanger 20 is formed of components other than the heat exchange tubes 21, the diameter D1 of the slag hole 16 may be set to three times or more the width, in the direction perpendicular to the gas flow F, of the gas flow path directed from the lower side to the upper side.

Other than this, for example, the above-described gasification furnace and the gasification portion are not limited to the use as a coal gasification furnace, a coal gasification portion, or a gasification furnace of an IGCC facility for gasifying coal; they may be appropriately modified within a scope not departing from the scope thereof.

REFERENCE SIGNS LIST 10 coal gasification portion (gasification portion)
12 combustor
14 startup fuel combustion chamber
16 slag hole
17 throat portion
20 heat exchanger (upper heat exchanger)
21 heat exchange tube
25 gas flow path
50 sintered material
100 IGCC plant
101 coal gasification furnace
102 coal gasification furnace pressure vessel
104 dust removing apparatus (gas purification facility)
105 desulfurization apparatus (gas purification facility)
106 gas turbine
107 exhaust heat recovery boiler 108 smokestack
109 steam turbine
111 condenser
112 low-pressure water supply pump
151 evaporator
152 coal gasification furnace steam drum
153 economizer
154 water pipe

The invention claimed is:

1. A gasification furnace comprising:
   a gasification portion that combusts fuel to produce high-temperature gas;
   a heat exchanger that is located above the gasification portion with which the heat exchanger communicates via a gas flow path, the heat exchanger having heat exchange tubes arranged in rows at a certain pitch in the gas flow direction, wherein the gasified fuel passes between the rows of heat exchange tubes and performs heat exchange with fluid flowing through the heat exchange tubes; and
   a slag hole that is formed at a bottom of the gasification portion, the slag hole having an opening diameter that is three times or more the pitch of the heat exchange tubes to permit discharge of a sintered material produced by gasifying the fuel.

2. The gasification furnace according to claim 1, wherein the gasification portion includes a combustor for combusting fuel, and a reductor for gasifying the fuel, the reductor being located above the combustor and communicating with the combustor via the gas passage.

3. The gasification furnace according to claim 1, wherein a throat portion formed by reducing the diameter of the flow path of the gasification portion is provided above the slag hole, the throat portion being formed such that the opening diameter thereof is three times or more the pitch of the heat exchange tubes of the heat exchanger.

4. A gasification power plant comprising:
   the gasification furnace according to claim 1;
   a gas purification facility that removes an impurity from the produced gas produced in the gasification furnace; and
   a gas turbine that is driven by the gas purified by the gas purification facility.

5. A method of preventing blockage of a slag hole in a gasification furnace, the method comprising:
   providing a gasification portion that combusts fuel to produce high-temperature gas; and
   providing a heat exchanger that is located above the gasification portion, the heat exchanger communicating with the gasification portion via a gas flow path and having heat exchange tubes arranged in rows at a certain pitch in the gas flow direction, wherein a gasified fuel passes between the rows of heat exchange tubes and performs heat exchange with fluid flowing through the heat exchange tubes,
   wherein an opening diameter of a slag hole formed at a bottom of the gasification portion is used to discharge a sintered material produced by gasifying the fuel,
   wherein the slag hole is set to three times or more the certain pitch of the heat exchange tubes arranged in rows in the gas flow direction in the heat exchanger.

6. A gasification power plant comprising:
   the gasification furnace according to claim 2;
   a gas purification facility that removes an impurity from the gas produced in the gasification furnace; and
   a gas turbine that is driven by the gas purified by the gas purification facility.

* * * * *